United States Patent Office 3,140,298
Patented July 7, 1964

3,140,298
SELECTED HYDROXYPOLYFLUOROPERHALO-CYCLOBUTANES AND THEIR PREPARATION FROM POLYFLUOROPERHALOCYCLOBUTANONES AND SELECTED UNSATURATES
David C. England, Wilmington, Del., assignor to E. I. du Pont de Nemours and Company, Wilmington, Del., a corporation of Delaware
No Drawing. Filed Apr. 2, 1959, Ser. No. 803,580
20 Claims. (Cl. 260—345.2)

This invention relates to, and has as its principal object provision of, a new class of polyfluorohydroxy compounds, more particularly a new class of polyfluoroperhalohydroxycyclobutyl compounds.

As indicated in U.S. Patents 2,996,518 and 3,030,362, the 2,2-dihalo-3,3,4,4-tetrafluorocyclobutanones undergo cycloaddition reactions with aldehydes and ketones and with nitriles to form new classes of six-membered ring heterocycles, specifically inclusive of the mono- and di-spiro-substituted 2,2-dihalo-3,3,4,4-tetrafluorocyclobutane-1,3,5-trioxanes and the corresponding mono- and dispiro - 2,2 - dihalo - 3,3,4,4 - tetrafluorocyclobutane-substituted-1,3,5-dioxazines and -oxadiazines.

While the reactions just described do afford new classes of useful materials, it has now been surprisingly found that with certain aldehydes, ketones, and nitriles, a second type of reaction also occurs. More specifically, with those aldehydes, ketones, and nitriles which contain chemically-reactive hydrogens on carbon alpha to the respective functionalties, i.e., alpha to the carboxaldehyde and ketone oxocarbonyl groups and the nitrile carbonitrile groups, the said active hydrogens add across the ring carbonyl of the 2,2-dihalo-3,3,4,4-tetrafluorocyclobutanone to form a new class of 1-hydroxy-2,2-dihalo-3,3,4,4-tetrafluorocyclobutyl-substituted products. The same reaction can also be effected with other compounds containing active hydrogen on carbon wherein the functionality effecting the actviation of the said hydrogen arises from the influence of a multiple carbon-carbon bond alpha to said carbon, such as in the monoolefins of at least three carbons, allene, and the hydrocarbon- and halo-hydrocarbon-substituted olefins, allenes, and acetylenes.

These coreactants, for use with the 2,2-dihalo-3,3,4,4-tetrafluorocyclobutanones in forming the new 2,2-dihalo-3,3,4,4 - tetrafluoro - 1 - hydroxycyclobutyl - substituted products of the present invention, thus have one controlling chemical and structural characteristic in common, viz., that they contain at least one chemically-reactive hydrogen, separated by at most one intervening saturated carbon atom from a carbon which is otherwise multiply linked to an element of atomic number 6–8 inclusive, i.e., carbon, oxygen, or nitrogen, the remainder of the molecule being otherwise wholly hydrocarbon or halohydrocarbon, including both saturated and unsaturated such radicals. The new tetrafluorodihalohydroxycyclobutyl-substituted products of the present invention are similarly related chemically and structurally in that they contain from one to two 3,3,4,4-tetrafluoro-2,2-dihalo-1-hydroxycyclobutyl radicals separated by at most one intervening saturated carbon atom each from a single carbon atom which is multiply bonded to a carbon, oxygen, or nitrogen atom, with any remaining valences of said multiply-bonded carbon and saturated carbon atoms satisfied by linkage to hydrogen or hydrocarbon or halohydrocarbon radicals, inclusive specifically of both saturated and unsaturated such radicals.

The new products of the invention may be represented by the following structural formulae:

(I) 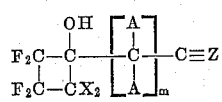

wherein: $m$ is an integer from 0 to 1; the X's, alike or different, are halogen of atomic number 9–35, inclusive; the A's, alike or different, are X, hydrogen, or monovalent hydrocarbon radicals which can be joined together to form with the indicated carbon atom a carbocycle of four to eight carbons; and Z is a single triply bonded unit selected from the class consisting of ≡N and ≡CR units wherein R is a hydrogen or a monovalent hydrocarbon radical, generally of no more than eight carbons;

(II) 

wherein $m$, X, and A are as above; R' is a member from the group consisting of X, hydrogen, and monovalent hydrocarbon and halohydrocarbon radicals, generally of no more than eight carbons, with the proviso that when R' is hydrocarbon it can be joined with one A to form with the indicated carbons a carbocycle of four to eight carbons; Z' is a single doubly bonded unit selected from the class consisting of =CR"$_2$, =C=CHR", and =O units; and R" is selected from the class consisting of hydrogen and monovalent hydrocarbon radicals, generally of no more than eight carbons; and (III) 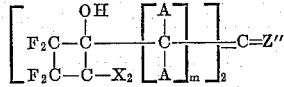

wherein $m$, X, and A are as above and Z" is a single doubly bonded unit selected from the class consisting of =O and =CR"$_2$ units wherein R" has its previous significance with the proviso that one A of each hydroxydihalotetrafluorocyclobutyl unit can be together linked to form with the indicated carbons a carbocycle of four to eight carbons.

These new mono- and bis(3,3,4,4-tetrafluoro-2,2-dihalo-1-hydroxycyclobutyl-substituted) products, wherein the said cyclobutyl rings are separated by at most one intervening saturated carbon atom each from a carbon atom which is multiply linked to another carbon, oxygen, or nitrogen atom with the remainder of the molecule being wholly hydrogen, hydrocarbon or halo-substituted hydrocarbon, and the preparation thereof are illustrated in greater detail but are not to be limited by the following more specific examples in which the parts given are by weight.

Example I

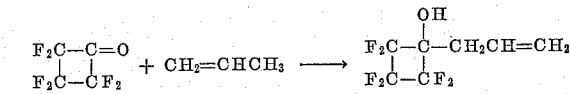

A thick-walled glass reactor approximately 20 diameters long and of internal capacity corresponding to about 150 parts of water was evacuated and cooled in a liquid nitrogen bath and then charged with a mixture of eight parts of perfluorocyclobutanone (preparable by the method of Example IV of my copending application Ser. No. 717,805) and four parts (2.0 molar proportions based on the ketone) of propylene. The reactor was then sealed and allowed to warm to room temperature, and then heated at 175° C. for 12 hours. The reactor was then cooled in a liquid nitrogen bath, opened, and the reaction mixture purified by distillation. There was thus obtained 8.5 parts (87% of theory) of 2,2,3,3,4,4-hexafluoro-1-hydroxy-1-(2-propenyl)cyclobutane as a clear, colorless liquid boiling at 114° C. at atmospheric pressure; $n_D^{25}$, 1.3541. The product can also be named 2,2,3,3,4,4-hexafluoro-1-(2-propenyl)cyclobutanol. The nuclear magnetic resonance and infrared specta were consistent with the hexafluoropropenylcyclobutanol structure.

*Analysis.*—Calcd. for $C_7H_6OF_6$: C, 38.2%; H, 2.8%; F, 51.8%. Found: C, 38.4%; H, 2.8%; F, 51.4%.

Example II

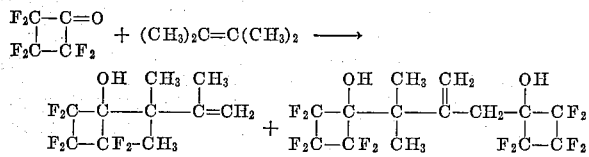

As in Example I, a glass reactor was evacuated, cooled and charged with seven parts of perfluorocyclobutanone and five parts (1.5 molar proportions based on the ketone) of tetramethylethylene. The reactor was sealed and allowed to warm to room temperature, at which point the reaction mixture was deep yellow. After warming overnight at steam bath temperatures, the reaction mixture had become water-white. The reactor was cooled in a liquid nitrogen bath, opened, and the reaction mixture purified by distillation. There was thus obtained 4.3 parts (42% of theory) of 2,2,3,3,4,4-hexafluoro-1-hydroxy-1(1,1,2-trimethyl-2-propenyl)cyclobutane as a clear, colorless liquid boiling at 124° C. under a pressure corresponding to 217 mm. of mercury. The product can also be named 2,2,3,3,4,4,-hexafluoro-1-(1,1,2-trimethyl - 2 - propenyl)-cyclobutanol. The infrared absorption spectrum was consistent with the hexafluorotrimethylpropenylcyclobutanol structure.

*Analysis.*—Calcd. for $C_{10}H_{12}F_6O$: C, 45.8%; H, 4.6%; F, 43.5%. Found: C, 46.0%; H, 4.5%; F, 43.1%.

From the distillation there was also obtained 3.8 parts (44% of theory) of 1,1-dimethyl-2-methylene-1,3-propylenebis(1-hydroxy-2,2,3,3,4,4 - hexafluorocyclobutane) as a clear, colorless liquid boiling at 179° C. under a pressure corresponding to 217 mm. of mercury. The 1,1-dimethyl-2-methylene-1,3 - propylenebis(2,2,3,3,4,4 - hexafluorocyclobutanol), on cooling, solidified and upon recrystallization from n-hexane was obtained as white crystals melting at 94–96° C.

*Analysis.*—Calcd. for $C_{14}H_{12}F_{12}O_2$: C, 38.2%; H, 2.8%; F, 51.8%. Found: C, 38.8%; H, 2.9%; F, 51.6%.

Example III

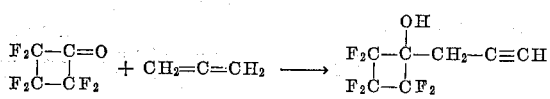

As in Example I, a glass reactor was evacuated, cooled, and charged with 17.5 parts of perfluorocyclobutanone and 6.5 parts (1.5 molar proportions based on the ketone) of allene. The reactor was sealed, allowed to warm to room temperature, and then heated at 165° C. for 12 hours. The reactor was then cooled in a liquid nitrogen bath, opened, and the reaction mixture purified by distillation. There was thus obtained 10.3 parts (47% of theory) of 2,2,3,3,4,4-hexafluoro-1-(2-propynyl)cyclobutanol as a clear, colorless liquid boiling at 116° C. at atmospheric pressure; $n_D^{25}$, 1.3584. The infrared and nuclear magnetic resonance spectra were wholly consistent with the hexafluorohydroxypropynylcyclobutane structure.

*Analysis.*—Calcd. for $C_7H_4F_6O$: C, 38.6%; H, 1.9%; F, 52.3%. Found: C, 38.7%; H, 2.1%; F, 52.1%.

Example IV

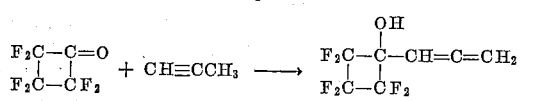

As in Example I, an evacuated glass reactor cooled in liquid nitrogen was charged with 6.5 parts of perfluorocyclobutanone and five parts (3.3 molar proportions based on the ketone) of methylacetylene. The reactor was sealed, allowed to warm to room temperature, and then heated at 165° C. for 12 hours. The reactor was then cooled in a liquid nitrogen bath, opened, and the reaction mixture removed and purified by distillation. There was thus obtained 4.2 parts (53% of theory) of 2,2,3,3,4,4-hexafluoro-1-propadienylcyclobutanol as a clear, colorless liquid boiling at 121° C. at atmospheric pressure; $n_D^{25}$, 1.3782. The infrared and nuclear magnetic resonance spectra were wholly consistent with the hexafluorohydroxypropadienylcyclobutane structure.

*Analysis.*—Calcd. for $C_7H_4F_6O$: C, 38.6%; H, 1.9%; F, 52.3%. Found: C, 39.1%; H, 2.1%; F, 51.8%.

Example V

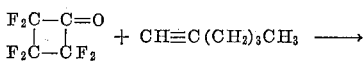

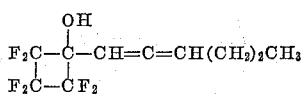

As in Example I, a glass reactor was cooled in liquid nitrogen and charged with eight parts of perfluorocyclobutanone and 3.7 parts (an equimolar proportion based on the ketone) of butylacetylene, i.e., 1-hexyne, and the reactor sealed and allowed to warm to room temperature. The reaction mixture was not homogeneous at this temperature, but on slight warming at steam bath temperatures the reaction mixture became homogeneous, indicating that reaction had been effected. The reactor was cooled and only one phase was evident. The reactor was then warmed at steam bath temperatures for a period of sixty hours, cooled in a liquid nitrogen bath, opened, and the reaction mixture purified by distillation. There was thus obtained nine parts (77% of theory) of 2,2,3,3,4,4-hexafluoro-1-(1,2-hexadienyl)cyclobutanol as a clear, colorless liquid boiling at 76° C. under a pressure corresponding to 20 mm. of mercury; $n_D^{25}$, 1.3982. The infrared and nuclear magnetic resonance spectra were wholly consistent with the hexafluorohexadienylhydroxycyclobutane structure.

*Analysis.*—Calcd. for $C_{10}H_{10}F_6O$: C, 46.2%; H, 3.9%; F, 43.8%. Found: C, 46.5%; H, 4.0%; F, 43.5%.

Example VI

As in Example I, an evacuated glass reactor, cooled in liquid nitrogen, was charged with 24.6 parts of phenylacetylene and 18 parts (2.4 molar proportions based on the acetylene) of perfluorocyclobutanone. The reactor was sealed and, upon warming slowly, the reaction mixture appeared as two phases. However, when the reactor was shaken at liquid ice/water bath temperatures, an exothermic reaction occurred, producing a homogeneous red solution. The reactor was cooled in liquid nitrogen, opened, and the product purified by distillation. No recovered perfluorocyclobutanone was obtained, but there was recovered 16.2 parts of the charged phenylacetylene. Upon further distillation, there was obtained 12.6 parts (44% of theory on the perfluorocyclobutanone used and 55% of theory on the phenylacetylene used) of 1-(2-phenylethynyl) - 2,2,3,3,4,4 - hexafluorocyclobutanol as a clear, colorless liquid boiling at 93° C. under a pressure corresponding to 5 mm. of mercury; $n_D^{25}$, 1.4671. The infrared and nuclear magnetic resonance spectra were wholly consistent with the phenylethynylhexafluorohydroxycyclobutane structure.

*Analysis.*—Calcd. for $C_{12}H_6OF_6$: C, 51.5%; H, 2.2%; F, 40.7%. Found: C, 51.7%; H, 2.4%; F, 40.8.

Example VII

As in Example I, a glass reactor was evacuated, cooled in liquid nitrogen, and charged with 27 parts of perfluorocyclobutanone, 4.5 parts (0.5 molar proportion based on the fluoroketone) of acetone, and 0.1 part of phosphorus pentoxide. The reactor was sealed and allowed to warm slowly to room temperature. An exothermic reaction occurred when the reaction mixture reached approximately room temperature. The reactor was heated at steam bath temperatures overnight and then cooled in liquid nitrogen and opened. There was thus recovered 2.5 parts of perfluorocyclobutanone. Fractionation of the crude reaction mixture afforded 0.7 part (3% of theory) of 6,6-dimethyl-2,2-,4,4-bis($\alpha,\gamma$-hexafluorotrimethylene)-1,3,5-trioxane as a clear, colorless liquid boiling at 84° C. under a pressure corresponding to 50 mm. of mercury; $n_D^{25}$, 1.3402. The nuclear magnetic resonance spectrum was wholly consistent with the hexafluorocyclobutanespirodimethyltrioxanespirohexafluorocyclobutane structure. This compound and the preparation thereof are disclosed and claimed in my above-mentioned copending application Ser. No. 774,595.

Continued distillation of the residue remaining from the isolation of the above dispirotrioxane afforded 4.7 parts (15% of theory) of 2,2,3,3,4,4-hexafluoro-1-acetylmethylcyclobutanol as a clear, colorless liquid boiling at 92° C. under a pressure corresponding to 50 mm. of mercury. On standing, the product solidified and upon recrystallization from n-hexane was obtained as white crystals melting at 60–61° C. The infrared and nuclear magnetic resonance spectra were wholly consistent with the 2,2,3,3,4,4-hexafluoro-1 - (2 - oxopropyl)cyclobutanol structure.

*Analysis.*—Calcd. for $C_7H_6O_2F_6$: C, 35.6%; H, 2.6%; F, 48.3%. Found: C, 35.8%; H, 2.8; F, 49.6%.

Continued distillation of the liquid residue remaining from the separation and isolation of the above dispirotrioxane and hexafluoroacetylmethylcyclobutanol afforded 20.2 parts (71% of theory) of 2-oxo-1,3-propylenebis(hexafluorocyclobutanol) as a clear, colorless liquid boiling at 153° C. under a pressure corresponding to 50 mm. of mercury. The product solidified and, after recrystallization from n-hexane, was obtained as a white, crystalline material melting at 91–92° C. The infrared and nuclear magnetic resonance spectra were wholly consistent with the oxopropylenebis(hexafluorocyclobutanol) structure.

*Analysis.*—Calcd. for $C_{11}H_6O_3F_{12}$: C, 31.9%; H, 1.5%; F, 55.0%. Found: C, 32.3%; H, 1.9%; F, 55.2%.

*Example VIII*

A glass reactor fitted with a stirrer and condenser and protected from the atmosphere with drying tubes was charged with 19.5 parts of 2-chloro-2,3,3,4,4-pentafluorocyclobutanone (preparable according to Example VIII of my copending application Ser. No. 717,805 and now abandoned) and 20.4 parts (2.0 molar proportions based on the fluorocyclobutanone) of phenylacetylene. On charging, an exothermic reaction occurred at room temperature. The reactor was cooled by external application of an ice/water bath, and when the reaction was under control, the cooling bath was removed and the reaction mixture allowed to slowly warm to room temperature. The reaction mixture was allowed to stand under these conditions for two hours and then separated by fractional distillation. There was thus obtained 10.5 parts (35% of theory) of 2-chloro-1-(2-phenylethynyl)-2,3,3,4,4-pentafluorocyclobutanol as a deep yellow liquid boiling at 103–104° C. under a pressure corresponding to 1 mm. of mercury. The infrared spectrum was wholly consistent with the chlorophenylethynylpentafluorocyclobutanol structure.

*Analysis.*—Calcd. for $C_{12}H_6ClF_5O$: C, 48.6%; H, 2.0%. Found: C, 48.7%; H, 2.2%.

On continued distillation, there was obtained 2.6 parts (9% of theory) of crude 2-chloro-2,3,3,4,4-pentafluoro-1-benzoylmethylcyclobutanol as a clear, colorless liquid boiling at 104–105° C. under a pressure corresponding to 1 mm. of mercury. On standing, the material solidified to afford crystals melting at 70–72° C. Upon recrystallization from n-hexane, the product melted at 74–75° C. The infrared spectrum of the product was wholly consistent with the chloropentafluorobenzoylmethylhydroxycyclobutane structure.

*Analysis.*—Calcd. for $C_{12}H_8ClF_5O_2$: C, 45.6%; H, 2.6%. Found: C, 44.4%; H, 2.5%.

The structure of the above hydrated phenylacetylenic product, i.e., the chloropentafluorobenzoylmethylcyclobutanol, was further proved by direct synthesis of the material from chloropentafluorocyclobutanone and acetophenone.

*Example IX*

As in Example I, a glass reactor was evacuated, cooled in a liquid nitrogen bath, and charged with 4.9 parts of 2-chloro-2,3,3,4,4-pentafluorocyclobutanone and 3.0 parts (an equimolar proportion based on the ketone) of acetophenone. The reactor was sealed and heated at steam bath temperatures for 17 hours. The reactor was cooled in liquid nitrogen, opened, and the crystalline reaction mixture rinsed out with n-hexane. After washing with additional n-hexane and drying, there was obtained 7.6 parts (96% of theory) of 2-chloro-2,3,3,4,4-pentafluoro-1-benzoylmethylcyclobutanol as white crystals melting at 75–77° C. The infrared spectrum is wholly consistent with the chloropentafluorobenzoylmethylhydroxycyclobutane structure. A mixed melting point of this product and the one previously described by hydration of the phenylethynylchloropentafluorocyclobutanol was 74.5–75.5° C., indicating the clear identity of the two products.

*Example X*

Into a glass reactor fitted with a stirrer and a condenser and protected from atmospheric moisture with drying tubes was charged 10.2 parts of phenylacetylene and 10.6 parts (0.5 molar proportion based on the acetylene) of 2,2-dichloro-3,3,4,4-tetrafluorocyclobutanone. The reaction mixture was allowed to stand with stirring at room temperature for 48 hours, and the product removed by distillation. There was thus obtained 4.1 parts (26% of theory) of 2,2-dichloro-1-(2-phenylethynyl)-3,3,4,4-tetrafluorocyclobutanol as a clear, colorless liquid boiling at 109–112° C. Under a pressure corresponding to 0.8 mm. of mercury. The infrared spectrum was wholly consistent with the dichlorophenylethynyltetrafluorohydroxycyclobutane structure.

*Analysis.*—Calcd. for $C_{12}H_6Cl_2F_4O$: C, 46.1%; H, 1.9%. Found: C, 45.8%; H, 2.0%.

*Example XI*

As in Example I, a cylindrical glass reactor was evacuated, cooled in a liquid nitrogen bath, and charged with four parts of propylene and 10.6 parts (0.5 molar proportion based on propylene) of 2,2-dichloro-3,3,4,4-tetrafluorocyclobutanone (preparable according to Example IX of my copending application Ser. No. 717,805). The reactor was sealed and the reaction mixture heated at 175° C. for 12 hours. The reactor was cooled in liquid nitrogen, opened, and the gummy, black reaction mixture removed and purified by distillation. There was thus obtained 3.9 parts (27% of theory) of 2,2-dichloro-3,3,4,4-tetrafluoro-1-(2-propenyl)cyclobutanol as a clear, colorless liquid boiling at 37–39° C. under a pressure corresponding to 0.6 mm. of mercury. The infrared spectrum was wholly consistent with the dichlorotetrafluorohydroxypropenylcyclobutane structure.

*Analysis.*—Calcd. for $C_7H_6Cl_2F_4O$: C, 33.2%; H, 2.4%. Found: C, 33.4%; H, 2.5%.

*Example XII*

As in Example I, a cylindrical glass reactor was evacuated, cooled in a liquid nitrogen bath, and charged with 21.1 parts of 2,2-dichloro-3,3,4,4-tetrafluorocyclobutanone and 5.8 parts (an equimolar proportion based on the fluoroketone) of acetone. The reactor was sealed, allowed to warm to room temperature, and then heated at steam bath temperatures for 18 hours. The reactor was cooled in a liquid nitrogen, opened, and the reaction mixture removed therefrom. Upon distillation, there was obtained 0.42 part of 6,6-dimethyl-2,2,-4,4-bis(α,α-dichloro-β,β,γ,γ-tetrafluorotrimethylene)-1,3,5-trioxane as a clear, colorless liquid boiling at 40–42° C. under a pressure corresponding to 7 mm. of mercury.

*Analysis.*—Calcd. for $C_{11}H_6Cl_4F_8O_3$: C, 27.5%; H, 1.3%. Found: C, 25.7%; H, 2.4%.

The dichlorotetrafluorocyclobutanespirodimethyltrioxanespirodichlorotetrafluorocyclobutane product is disclosed and claimed broadly in my copending application Ser. No. 774,595. Continued distillation of the reaction mixture afforded 22 parts (82% of theory) of 2,2-dichloro-3,3,4,4-tetrafluoro-1-acetylmethylcyclobutanol as a clear, colorless liquid boiling at 81° C. under a pressure corresponding to 4.0 mm. of mercury. On standing, the dichlorotetrafluoro-2-oxo-n-propylcyclobutanol solidified affording white crystals melting at 51.5–52.0° C.

*Analysis.*—Calcd. for $C_7H_6Cl_2F_4O_2$: C, 31.2%; H, 2.2%. Found: C, 30.6%; H, 2.3%.

Example XIII

As in Example I, a cylindrical glass reactor was evacuated, cooled in a liquid nitrogen bath, and charged with 21.1 parts of 2,2-dichloro-3,3,4,4-tetrafluorocyclobutanone and 9.8 parts (an equimolar proportion based on the cyclobutanone) of cyclohexanone. The reactor was sealed, warmed to room temperature, and then heated at steam bath temperatures for 72 hours. The reactor was cooled in liquid nitrogen, opened, and the partially solidified reaction mixture washed out with n-hexane. The solid product was removed by filtration and recrystallized from n-hexane. There was thus obtained 10.2 parts (33% of theory) of 2,2-dichloro-1-(2-oxocyclohexyl)-3,3,4,4-tetrafluorocyclobutanol as white crystals melting at 150–152° C. The infrared spectrum was fully consistent with the dichlorooxocyclohexyltetrafluorohydroxycyclobutane structure.

*Analysis.*—Calcd. for $C_{10}H_{10}Cl_2F_4O_2$: C, 38.9%; H, 3.3%. Found: C, 38.9%; H, 3.2%.

Example XIV

As in Example I, a cylindrical glass reactor was evacuated, cooled in a liquid nitrogen bath, and charged with 26 parts of perfluorocyclobutanone and 16.7 parts (an equimolar proportion based on the fluorocyclobutanone) of n-heptaldehyde. The reactor was sealed, warmed to room temperature, and finally heated overnight at steam bath temperatures. The reactor was then cooled in liquid nitrogen, opened, and the product purified by distillation. There was thus obtained 23 parts (55% of theory) of 2,2,3,3,4,4 - hexafluoro-1-(1-formyl-n-hexyl(cyclobutanol as a clear, colorless liquid boiling at 98° C. under a pressure corresponding to 10 mm. of mercury. On standing, the product solidified, affording white crystals melting at 63–67° C. Recrystallization from n-hexane afforded the purified product melting at 67–69° C. The infrared and nuclear magnetic resonance spectra were wholly consistent with the hexafluoroformylhexyhydroxycyclobutane structure.

*Analysis.*—Calcd. for $C_{11}H_{14}F_6O_2$: C, 45.2%; H, 4.8%; F, 39.0%. Found: C, 45.5%; H, 5.0%; F, 38.5%.

Example XV

As in Example I, a cylindrical glass reactor was evacuated, cooled in a liquid nitrogen bath, and charged with 21 parts of perfluorocyclobutanone and 50 parts (five molar proportions based on the fluoroketone) of cyclopentanone. The reactor was sealed, warmed to room temperature, and then heated at steam bath temperatures for 120 hours. The reactor was then cooled in liquid nitrogen, opened, and the product removed and separated by distillation. After unreacted cyclopentanone was recovered, there remained a solid residue which was roughly distilled. It solidified as it distilled. The solid was then recrystallized from chloroform to give 8.1 parts of first crop material melting at 129–134° C. and 11 parts of a second crop material. The total yield of 1-(2-oxocyclopentyl)-2,2,3,3,4,4-hexafluorocyclobutanol is thus 19.1 parts corresponding to 61% of theory. After a second recrystallization from chloroform, the first crop afforded 7.1 parts of pure oxocyclopentylhexafluorocyclobutanol as white crystals melting at 133–135° C. The infrared spectrum was wholly consistent with the oxocyclopentylhexafluorocyclobutanol structure.

*Analysis.*—Calcd. for $C_9H_8F_6O$: C, 41.3%; H, 3.1%; F, 43.5%. Found: C, 41.2%; H, 3.2%; F, 43.7%.

Example XVI

As in Example I, a cylindrical glass recator was evacuated, cooled in a liquid nitrogen bath, and charged with 40 parts of perfluorocyclobutanone and 9.5 parts (0.5 molor proportion based on the fluoroketone) of cyclopentanone. The reactor was sealed, warmed to room temperature, and then heated at steam bath temperatures overnight. After three hours on the steam bath the refluxing in the reactor was much less vigorous, signifying substantial completion of the reaction. At the end of the overnight heating, massive crystals were present in the tube. Heating on the steam bath was continued for eight days. The reactor was then cooled in liquid nitrogen, opened, and the solid contents removed and recrystallized from benzene. There was thus obtained 28 parts (57% of theory) of crude 1,1'-2-oxo-1,3-cyclopentylenebis(perfluorocyclobutanol) as white crystals melting at 131–139° C. The product was twice recrystallized from benzene, thereby affording 20.9 parts of the pure product which can also be identified as cyclopentanone-2,5-bis(perfluorocyclobutanol) as white crystals melting at 138–139° C. The infrared spectrum was wholly consistent with the oxocyclopentylenebis(perfluorocyclobutanol) structure.

*Analysis.*—Calcd. for $C_{13}H_8F_{12}O_3$: C, 35.5%; H, 1.8%; F, 51.8%. Found: C, 35.7%; H, 2.0%; F, 51.8%.

Example XVII

As in Example I, a cylindrical glass reactor was evacuated, cooled in a liquid nitrogen bath, and charged with 18 parts of perfluorocyclobutanone and five parts (0.5 molar proportion based on the fluoroketone) of cyclohexanone. The reactor was then sealed, allowed to warm to room temperature, and held under these conditions overnight. The reaction mixture had set to a mass of crystals. The reactor was cooled in liquid nitrogen, opened, and the excess perfluorocyclobutanone removed by distillation. The solid residue was recrystallized from carbon tetrachloride. There was thus obtained 8.6 parts (61% of theory) of 1-(2-oxocyclohexyl)-2,2,3,3,4,4-hexafluorocyclobutanol. After two further recrystallizations from carbon tetrachloride, the purified oxocyclohexylperfluorocyclobutanol exhibited a melting point of 135.6° C. The infrared spectrum was wholly consistent with the oxocyclohexylperfluorocyclobutanol structure.

*Analysis.*—Calcd. for $C_{10}H_{10}O_2F_6$: C, 43.5%; H, 3.7%; F, 41.3%. Found: C, 43.3%; H, 3.9%; F, 42.0%.

Example XVIII

As in Example I, a cylindrical glass reactor was evacuated, cooled in a liquid nitrogen bath, and charged with 44 parts of perfluorocyclobutanone and 12 parts (0.5 molar proportion based on the fluoroketone) of cyclohexanone. The reactor was sealed, allowed to warm to room temperature and then heated at steam bath temperatures. Within one-half hour, crystals formed in the reaction mixture. After two days of heating under these conditions, the reaction mixture was again liquid. After three days of heating, crystals began to form again. The reaction was heated at steam bath temperatures for a total of ten days. The reactor was then cooled in liquid nitrogen, opened, and the crystalline product removed. After recrystallization from carbon tetrachloride, there was thus obtained 25 parts (44.8% of theory) of 2,6- cyclohexanonebis(perfluorocyclobutanol) as white crystals melting at 150–152° C. After another recrystallization from carbon tetrachloride, there was obtained 21.7 parts of the pure 1,1'-2-oxo-1,3-cyclohexylenebis(hexafluorocyclobutanol) as white crystals melting at 152–153° C. The infrared spectrum was wholly consistent with the oxocyclohexylenebis(perfluorocyclobutanol) structure.

Analysis.—Calcd. for $C_{14}H_{10}F_{12}O_3$: C, 37.0%; H, 2.2%; F, 50.2%. Found: C, 37.1%; H, 2.2%; F, 50.3%.

Example XIX

As in Example I, a cylindrical glass reactor was evacuated, cooled in a liquid nitrogen bath, and charged with 49 parts of perfluorocyclobutanone and 15.4 parts (0.5 molar proportion based on the fluoroketone) of cycloheptanone. The reactor was sealed, allowed to warm to room temperature, and then heated at steam bath temperatures for eleven days. The reactor was then cooled in liquid nitrogen, opened, and purified by distillation. There was thus obtained 7.6 parts (19% of theory) of crude 1-(2-oxocycloheptyl)-2,2,3,3,4,4-hexafluorocyclobutanol as a clear, colorless liquid boiling at 104–109° C. under a pressure corresponding to 10 mm. of mercury. The product solidified on standing and after recrystallization from n-hexane, the purified oxocycloheptylhexafluorocyclobutanol was obtained as white crystals melting at 44–45° C. The infrared spectrum was wholly consistent with the oxocycloheptylhexafluorocyclobutanol structure.

Analysis.—Calcd. for $C_{11}H_{12}F_6O_2$: C, 45.6%; H, 4.2%; F, 39.3%. Found: C, 45.3%; H, 4.2%; F, 39.5%.

Further distillation of the residue remaining from the isolation of the above oxocycloheptylhexafluorocyclobutanol afforded 46 parts (72% of theory) of crude 2,7-cycloheptanonebis(perfluorocyclobutanol) as a clear, colorless liquid boiling at 103° C. under a pressure corresponding to 1 mm. of mercury. The product solidified on standing and melted over the range 70–86° C.—apparently a mixture of isomers. Recrystallization from n-hexane afforded the pure 1,1'-2-oxo-1,3-cycloheptylenebis(perfluorocyclobutanol) as white crystals melting at 105–117° C.

Example XX

As in Example I, a cylindrical glass reactor was evacuated, cooled in liquid nitrogen, and charged with 48 parts of perfluorocyclobutanone and 32 parts (an equivolar proportion based on the fluoroketone) of acetophenone. The reaction was sealed, warmed to room temperature, and then heated at steam bath temperature. After one hour, refluxing had nearly ceased and the reaction mixture crystallized on cooling. Heating was continued at steam bath temperatures overnight and the reactor was then cooled in liquid nitrogen and opened. The solid product was recrystallized from carbon tetrachloride to give 67 parts (84% of theory) of 2,2,3,3,4,4-hexafluoro-1-benzoylmethylcyclobutanol as white crystals melting at 100–102° C. Further recrystallization from carbon tetrachloride did not change the melting point. The infrared spectrum was wholly consistent with the hexafluorobenzoylmethylcyclobutanol structure.

Analysis.—Calcd. for $C_{10}H_8F_6O_2$: C, 48.4%; H, 2.7%; F, 38.3%. Found: C, 48.3%; H, 2.9%; F, 38.5%.

Example XXI

As in Example I, a cylindrical glass reactor was evacuated, cooled in a liquid nitrogen bath, and charged with 38 parts of perfluorocyclobutanone and 12 parts (0.5 molar proportion based on the fluoroketone) of 1,1,1-trifluoroacetone. The reactor was sealed, warmed to room temperature, and then heated at steam bath temperature for eight days. At the end of this time, refluxing was still vigorous, indicating that substantially no reaction had occurred. The reactor was then heated to 175° C. for 12 hours. The reactor, when reheated at steam bath temperatures, no longer exhibited refluxing of the perfluorocyclobutanone. The reactor was cooled in liquid nitrogen, opened, and the product purified by distillation. There was thus obtained 13.6 parts (44% of theory) of 2,2,3,3,4,4-hexafluoro-1-trifluoroacetylmethylcyclobutanol as a clear, colorless liquid boiling at 81° C. under a pressure corresponding to 150 mm. of mercury; $n_D^{25}$, 1.3266. The nuclear magnetic resonance spectrum was wholly consistent with the hexafluorotrifluoroacetylmethylcyclobutanol structure.

Analysis.—Calcd. for $C_7H_3F_9O_2$: C, 29.0%; H, 1.0%; F, 59.0%. Found: C, 29.0%; H, 1.2%; F, 58.9%.

Continued distillation of the residue remaining from the isolation and purification, as above, of the hexafluorotrifluoroacetylmethylcyclobutanol afforded 20.5 parts (41% of theory) of 1,1'-trifluoroacetylmethylenebis-(hexafluorocyclobutanol) as a clear, colorless liquid boiling at 111° C. under a pressure corresponding to 140 mm. of mercury; $n_D^{25}$, 1.3325.

Analysis.—Calcd. for $C_{11}H_3F_{15}O_3$: C, 28.2%; H, 0.6%; F, 60.9%. Found: C, 28.6%; H, 0.8%; F, 60.5%.

Example XXII

As in Example I, a cylindrical glass reactor was evacuated, cooled in a liquid nitrogen bath, and charged with 47 parts of perfluorocyclobutanone and 9.2 parts (0.5 molar proportion based on the fluoroketone) of methyl vinyl ketone containing phenothiazine as a polymerization inhibitor. The reactor was sealed, warmed to room temperature, and then heated overnight at steam bath temperatures. The reactor was then cooled in liquid nitrogen, opened, and the product purified by distillation. There was thus obtained 16 parts (50% of theory) of 1-propenoylmethyl-2,2,3,3,4,4-hexafluorocyclobutanol as a clear, colorless liquid boiling at 85° C. under a pressure corresponding to 20 mm. of mercury. On standing, the product solidified.

After two recrystallizations from carbon tetrachloride, the pure propenoylmethylhexafluorocyclobutanol, i.e., 1-(2-oxo-3-butenyl)-2,2,3,3,4,4-hexafluorocyclobutanol, was obtained as white crystals melting at 56–57° C. with previous softening. Two further recrystallizations did not change the melting behavior. The propenoylmethylhexafluorocyclobutanol was easily polymerized in solution in refluxing benzene with added benzoyl peroxide. The crude propenoylmethylhexafluorocyclobutanol polymerized spontaneously on standing. The infrared spectrum of the monomeric material was wholly consistent with the propenoylmethylhexafluorocyclobutanol structure.

Analysis.—Calcd. for $C_8H_6F_6O_2$: C, 38.7%; H, 2.4%; F, 46.0%. Found: C, 38.4%; H, 2.5%; F, 46.0%.

Continued distillation of the original reaction residue remaining after the isolation of the above propenoylmethylhexafluorocyclobutanol afforded 12 parts (21% of theory) of crude 3-acetyl-2-(2,2,3,3,4,4-hexafluoro-1-hydroxycyclobutyl)-5,5,6,6,7,7-hexafluoro-1-oxaspiro-[3.3]heptane as a clear, colorless liquid boiling at 144° C. under a pressure corresponding to 20 mm. of mercury. The product solidified on standing and after recrystallization from benzene was obtained as white crystals melting at 126–130° C. Nuclear magnetic resonance spectra indicated two combined moles of perfluorocyclobutanone per mole of combined methyl vinyl ketone. The infrared spectrum indicated the presence of hydroxyl and carbonyl groups, but no carbon-carbon double bonds.

Analysis.—Calcd for $C_{12}H_6F_{12}O_3$: C, 33.8%; H, 1.4%; F, 53.5%. Found: C, 34.2%; H, 1.8%; F, 52.6%.

As above, a cylindrical glass reactor was evacuated, cooled in a liquid nitrogen bath, and charged with 48 parts of perfluorocyclobutanone and 18.4 parts (an equimolar proportion based on the fluoroketone) of methyl vinyl ketone containing phenothiazine as a polymerization inhibitor. The reactor was sealed, warmed to room temperature, and then heated for two hours at steam bath temperatures. The reactor was then cooled in liquid nitrogen, opened, and the product purified by distillation. No perfluorocyclobutanone was recovered, but there was obtained 11 parts (17% of theory) of 1-(3-oxo-1-butenyl)-2,2,3,3,4,4-hexafluorocyclobutanol as a clear, colorless liquid boiling at 49° C. under a pressure corresponding to 20 mm. of mercury; $n_D^{25}$, 1.3645. The infrared and nuclear magnetic resonance spectra was consistent with the 1 - (3 - oxo-1-butenyl)perfluorocyclobutanone structure. Unlike the previously described isomeric 1-(2-oxo-3-butenyl)-2,2,3,3,4,4-hexafluorocyclobutanol, the 1-(3-oxo-1-butenyl)perfluorocyclobutanol could not be polymerized.

*Analysis.*—Calcd. for $C_8H_6F_6O_2$: C, 38.7%; H, 2.4%; F, 46.0%. Found: C, 38.0%; H, 2.3%; F, 46.1%.

Continued distillation of the original reaction residue afforded 16 parts (24% of theory) of the above isomeric 1-(2-oxo-3-butenyl)-2,2,3,3,4,4-hexafluorocyclobutanol.

In the manner just described, a cylindrical glass reactor was charged with 2.9 parts of the above 1-(3-oxo-1-butenyl)perfluorocyclobutanol and 12 parts of perfluorocyclobutanone. The reaction mixture was heated overnight at steam bath temperatures. Upon cooling and opening as before, nine parts of perfluorocyclobutanone was recovered, leaving a semisolid residue which was recrystallized from methanol to afford 1.6 parts of solid crystals melting at 73–74.5° C. An additional recrystallization from methanol did not change the melting point. The product contains two combined moles of perfluorocyclobutanone per combined mole of methyl vinyl ketone. The infrared spectrum indicated no carbon-carbon double bond or carbonyl and the hydroxyl absorption was weak.

*Analysis.*—Calcd. for $C_{12}H_6F_{12}O_3$: C, 33.8%; H, 1.4%; F, 53.5%. Found: C, 34.0%; H, 1.6%; F, 53.5%.

The methanol filtrate from the above recrystallization was concentrated and, upon distillation, there was obtained an additional 0.5 part of the above 2:1 perfluorocyclobutanone/methyl vinyl ketone product obtained as a liquid boiling at 103–123° C. under a pressure corresponding to 20 mm. of mercury. The product solidified and after recrystallization from methanol was shown by melting point and mixed melting point to be the above 2:1 adduct. A further 0.7-part cut boiling above 130° C. under a pressure corresponding to 20 mm. solidified on standing and, on recrystallization from benzene, was obtained as white crystals melting at 129–132.5° C. This melting point and a mixed melting point with an additional sample of the above previously described product showed the product to be 3-acetyl-2-(2,2,3,3,4,4-hexafluoro-1-hydroxycyclobutyl) - 5,5,6,6,7,7 - hexafluoro - 1-oxaspiro[3.3]heptane.

*Example XXIII*

As in Example I, a cylindrical glass reactor was evacuated, cooled in a liquid nitrogen bath, and charged with 33 parts of perfluorocyclobutanone and 41 parts (2.0 molar proportions based on the fluoroketone) of styrene containing phenothiazine polymerization inhibitor. The reactor was sealed and warmed in a cold water bath. The reaction mixture was immiscible, but an exothermic reaction occurred when the reactor was shaken at room temperature. After standing overnight at room temperature, the reactor was cooled in liquid nitrogen, opened, and the reaction mixture purified by distillation. There was thus recovered 25 parts (63% of theory) of styrene and 16 parts (37% of theory) of 1-β-phenylvinyl)hexafluorocyclobutanol as a clear, colorless liquid boiling at 79° C. under a pressure corresponding to 1 mm. of mercury; $n_D^{25}$, 1.4695. The infrared spectrum was wholly consistent with the 1-styrylhexafluorocyclobutanol structure.

*Analysis.*—Calcd. for $C_{12}H_8F_6O$: C, 51.1%; H, 2.9%; F, 40.4%. Found: C, 51.3%; H, 3.3%; F, 40.2%.

The above reaction was repeated varying in that 9 parts of inhibited styrene and 34 parts (0.45 molar proportion based on the styrene) of perfluorocyclobutanone were used. After being processed similarly, there was recovered 8 parts of perfluorocyclobutanone and a crystalline residue which contained some polymer. Upon recrystallization from n-hexane, there was thus obtained 24.1 parts (64.5% of theory) of 3-(2,2,3,3,4,4-hexafluoro-1 - hydroxycyclobutyl)isochroman - 1 - spiro - 1' - perfluorocyclobutane as white crystals melting at 91.5–94.0° C. Further recrystallization from n-hexane afforded material melting at 93–95° C. The infrared and nuclear magnetic resonance spectra were in agreement with the hexafluorohydroxycyclobutylisochromanspiroperfluorocyclobutane structure.

*Analysis.*—Calcd. for $C_{16}H_8O_2F_{12}$: C, 41.8%; H, 1.8%; F, 49.6%. Found: C, 42.1%; H, 1.8%; F, 49.5%.

*Example XXIV*

As in Example I, a cylindrical glass reactor was evacuated, cooled in a liquid nitrogen bath, and charged with 19 parts of perfluorocyclobutanone and 50.0 parts (4 molar proportions based on the fluoroketone) of α-methylstyrene containing phenothiazine as a polymerization inhibitor. The reactor was sealed and warmed to room temperature, at which point the reaction mixture was immiscible but rapid mixture occurred with shaking at room temperature. After standing for about two months under these conditions, the reactor was cooled, opened, and the reaction mixture purified by distillation. There was thus obtained 25 parts (79% of theory) of 1-(2-phenyl - 2 - propenyl) - 2,2,3,3,4,4 - hexafluorocyclobutanol as a clear, colorless liquid boiling at 130° C. under a pressure corresponding to 22 mm. of mercury; $n_D^{25}$, 1.4620. The infrared spectrum was wholly consistent with the hexafluorophenylpropenylcyclobutanol structure.

*Analysis.*—Calcd. for $C_{13}H_{10}F_6O$: C, 52.8%; H, 3.4%; F, 38.5%. Found: C, 52.8%; H, 3.6%; F, 38.1%.

*Example XXV*

As in the previous examples, a cylindrical glass reactor was evacuated, cooled in a liquid nitrogen bath, and charged with 28 parts of perfluorocyclobutanone and 9 parts (0.5 molar proportion based on the fluoroketone) of α-methylstyrene containing phenothiazine as a polymerization inhibitor. The reactor was sealed and allowed to warm to room temperature. At this temperature with shaking, a very exothermic reaction occurred with the color of the reaction mixture changing from red to blue to violet and finally becoming colorless. The mixture set to a crystalline solid which did not melt at steam bath temperatures.

The reactor was heated overnight at steam bath temperatures, cooled in liquid nitrogen, and opened. Upon distillation, there was thus recovered six parts of perfluorocyclobutanone, 1.8 parts of a polymer insoluble in diethyl ether, and a crystalline residue which was recrystallized from n-hexane to afford 22.6 parts (77% of theory) of 1,1'-1-(phenylvinyl)methylenebis(hexafluorocyclobutanol) as white crystals melting at 99–101° C. A further recrystallization from n-hexane did not change the melting point. The infrared spectrum was wholly consistent with the 2-styrylmethylenebis(perfluorocyclobutanol), i.e., 2-phenyl-2propenylidenebis(hexafluorocyclobutanol) structure.

*Analysis.*—Calcd. for $C_{17}H_{10}F_{12}O_2$: C, 43.1%; H, 2.1%; F, 48.8%. Found: C, 43.3%; H, 2.4%; F, 48.5%.

*Example XXVI*

As in Example I a cylindrical glass reactor was evacuated, cooled in liquid nitrogen, and charged with 38 parts of perfluorocyclobutanone and 8.4 parts (0.33 molar proportion based on the ketone) of phenylacetonitrile and the reactor then sealed. The resulant immiscible liquid reaction mixture was heated in the sealed reactor for 90 hours at steam bath temperatures with no apparent reaction. The reactor was then heated at 175° C. for 12 hours, at the end of which time the reaction mixture was homogeneous when warm. A crystalline solid separated as the reactor cooled to room temperature. The reactor was cooled in liquid nitrogen and then opened; there was recovered therefrom 17 parts (44.7% recovery) of unreacted perfluorocyclobutanone.

The solid residue was recrystallized from n-hexane and there was thus obtained 9.5 parts of mixed products melting over the range 119–147° C. Upon a further recrystallization from n-hexane two categorically different crystalline forms were noted, one in needle form and the other in rhomboid form. These two crystalline materials were separated mechanically. From 5.7 parts of the mixture there was obtained 1.8 parts of the needle product melting at 128–130° C. and 3.4 parts of rhomboid product melting at 160–162° C. After two more recrystallizations from n-hexane, the needle product was found to exhibit a melting point of 129–130° C. and to be much less soluble than the rhomboid product. The needle product was characterized as 1-($\alpha$-cyanobenzyl)-2,2,3,3,4,4-hexafluorocyclobutanol, i.e., $\alpha$-(2,2,3,3,4,4-hexafluoro-1-hydroxycyclobutyl)phenylacetonitrile.

*Analysis.*—Calcd. for $C_{12}H_7F_6NO$: C, 48.9%; H, 2.4%; F, 38.6%; N, 4.7%. Found: C, 49.0%; H, 2.6%; F, 38.6%; N, 4.7%.

*Example XXVII*

As in Example I, a cylindrical glass reactor was evacuated, cooled in liquid nitrogen, and charged with 6 parts of commercial divinylbenzene (a mixture of position isomers) containing phenothiazine as a polymerization inhibitor and 32 parts (4.0 molar proportions based on the divinylbenzene) of perfluorocyclobutanone, and the reactor was then sealed. On warming and shaking at room temperature, the reaction mixture turned black. With further shaking, the color diminished and after about one-half hour the mixture was pale yellow and slightly cloudy. After warming on the steam bath overnight, the reactor was cooled in liquid nitrogen and then opened. There was recovered therefrom 12 parts of perfluorocyclobutanone. On distillation of the reaction residue, there was obtained 4 parts of crude 3-(1-hydroxyhexafluorocyclobutyl)-ar.-ethyl-isochroman - 1 - spiro-1'-perfluorocyclobutane as a viscous liquid boiling at 98–104° C. under a pressure corresponding to 1 mm. of mercury which solidified on standing. After two recrystallizations from n-hexane, it was obtained as white crystals melting at 96–99° C. The infrared spectrum was consistent with the hydroxyhexafluorocyclobutylethyliso-
                            chromanspiroperfluorocyclobutane structure. This product arose from a contaminant amount of ethylstyrene in the commercial divinylbenzene.

*Analysis.*—Calcd. for $C_{18}H_{12}F_{12}O_2$: C, 44.3%; H, 2.5%; F, 46.7%. Found: C, 44.2%; H, 2.8%; F, 46.8%.

Continued distillation of the reaction residue afforded 9.5 parts of 3 - (1-hydroxyhexafluorocyclobutyl)-ar.-[$\beta$-(1 - hydroxyhexafluorocyclobutyl)vinyl]isochroman - 1-spiro-1'-hexafluorocyclobutane as a clear liquid boiling at 135° C. under a pressure corresponding to 1 mm. of mercury; $n_D^{25}$, 1.4366. On cooling, the product set to a glass. The infrared spectrum was wholly consistent with the hydroxyhexafluorocyclobutyl - $\beta$ - hydroxyhexafluoro-
     cyclobutylvinylisochromanspirohexafluorocyclobutane structure.

*Analysis.*—Calcd. for $C_{22}H_{10}F_{18}O_3$: F, 51.6%. Found: F, 51.2%.

*Example XXVIII*

(A) As in Example I, a cylindrical glass reactor was evacuated, cooled in a liquid nitrogen bath, and charged with a mixture of 22 parts of perfluorocyclobutanone and 0.7 part (0.021 molar proportion based on the ketone) of hydrogen cyanide and a trace of potassium cyanide catalyst. The reactor was sealed and the frozen charge melted and the reactor warmed to about 60° C., at which point a vigorous exothermic reaction occurred. The reactor was then heated for a short time at steam bath temperatures, then cooled in a liquid nitrogen bath, and opened. There was recovered from the reaction mixture seven parts of perfluorocyclobutanone and 15 parts (100% theory) of the 1:2 hexafluorocyclobutanone cyanohydrin:hexafluorocyclobutanone complex as a white, crystalline solid insoluble in water but soluble in benzene. After three recrystallizations from benzene with considerable loss each time, the melting point of the solid was raised to 60–62° C.

*Analysis.*—Calcd. for $C_{13}HF_{18}NO_3$: C, 27.8%; H, 0.2%; N, 2.5%; F, 61.0%. Found: C, 27.9%; H, 0.5%; N, 2.4%; F, 61.4%.

The complex readily lost perfluorocyclobutanone on standing at room temperature in an open vessel, and attempted distillation at reduced pressure resulted in the loss of one mole of perfluorocyclobutanone to form the 1:1 perfluorocyclobutanone cyanohydrin:cyclobutanone complex below.

(B) As in Example I, a cylindrical glass reactor was evacuated, cooled in a liquid nitrogen bath, and charged with a mixture of 1.5 parts of hydrogen cyanide, 41 parts (5.0 molar proportions based on the nitrile) of perfluorocyclobutanone, and a trace of potassium cyanide catalyst. The reactor was sealed and the frozen charge melted by immersing the sealed reactor in cold water. An exothermic reaction occurred on shaking, forming the above white, solid 1:2 hexafluorocyclobutanone cyanohydrin:hexafluorocyclobutanone complex. The reactor was then cooled in liquid nitrogen, opened, and warmed at steam bath temperatures while connected to a trap cooled in a solid carbon dioxide/acetone mixture. There was thus recovered 11 parts of perfluorocyclobutanone. The resultant liquid residue in the reactor was then distilled at reduced pressure. There was thus recovered an additional seven parts of perfluorocyclobutanone and 21.4 parts (86% of theory) of the 1:1 hexafluorocyclobutanone cyanohydrin:hexafluorocyclobutanone complex as a clear, colorless, water-insoluble liquid boiling at 83° C. under a pressure corresponding to 20 mm. of mercury; $n_D^{25}$, 1.3418.

*Analysis.*—Calcd. for $C_9HF_2NO_2$: C, 28.2%; H, 0.3%; N, 3.7%; F, 59.5%. Found: C, 28.4%; H, 0.7%; N, 3.8%; F, 59.7%.

(C) As before, a cylindrical glass reactor was evacuated, cooled in a liquid nitrogen bath, and charged with 65 parts of perfluorocyclobutanone and 14 parts (equimolar on the ketone) of hydrogen cyanide containing a trace of potassium cyanide catalyst. The reactor was sealed and warmed slightly, at which point there was a vigorous exothermic reaction. The reactor was then heated overnight at steam bath temperatures, cooled in liquid nitrogen, and opened. The reaction mixture, which contained some crystalline solid, was distilled, whereby there was obtained 15 parts of low boiling material, most of which was recovered hydrogen cyanide. There was also obtained 42.6 parts (54% of theory) of hexafluorocyclobutanone cyanohydrin, i.e., 2,2,3,3,4,4-hexafluoro-1-hydroxycyclobutane carbonitrile, as a clear, colorless liquid boiling at 63° C. under a pressure corresponding to 20 mm. of mercury. The hexafluorocyclobutanone cyanohydrin solidified on standing to a very hygroscopic, water-soluble material. The infrared and n–m–r spectra were wholly consistent with the cyanohexafluorohydroxycyclobutane structure.

*Analysis.*—Calcd. for $C_5HF_6NO$: C, 29.3%; H, 0.5%; N, 6.8%; F, 55.6%; M.W., 205. Found: C, 29.8%; H, 0.9%; N, 6.2%; F, 55.4%; M.W., 197 (freezing point in water).

Continued distillation of the above reaction residue afforded 18.2 parts (25% of theory) of the 1:1 hexafluorocyclobutanone cyanohydrin : hexafluorocyclobutanone complex as a clear, colorless liquid boiling at 83° C. under a pressure corresponding to 20 mm. of mercury; $n_D^{25}$, 1.3418. Redistillation of this 1:1 complex afforded 6.6 parts of the cyanohydrin as a liquid boiling at 144° C. at atmospheric pressure which solidified on standing and five parts of recovered perfluorocyclobutanone.

*Example XXIX*

As in Example I, a cylindrical glass reactor was evacuated, cooled in a liquid nitrogen bath, and charged with 14 parts of freshly distilled 4-vinylcyclohexene and 23 parts (an equimolar proportion based on the olefin) of perfluorocyclobutanone. The reactor was then sealed, warmed to room temperature, and heated at steam bath temperatures overnight. The reactor was then cooled in liquid nitrogen, opened, and the reaction mixture separated by distillation. There was thus obtained three parts of recovered 4-vinylcyclohexene and 17 parts (46% of theory) of 2,2,3,3,4,4-hexafluoro - 1 - [β - (3 - cyclohexenyl)vinyl]cyclobutanol as a clear, colorless liquid boiling at 56° C. under a pressure corresponding to 1 mm. of mercury; $n_D^{25}$, 1.4228. The infrared spectrum was in accord with the cyclohexenylvinylhexafluorocyclobutanol structure.

*Analysis.*—Cald. for $C_{12}H_{12}F_6O$: C, 50.4%; H, 4.2%; F, 39.9%. Found: C, 50.9%; H, 4.4%; F, 39.5%.

Continued distillation of the reaction residue afforded 14 parts (46% of theory) of 2-(3-cyclohexenyl)vinylidenebis(2,2,3,3,4,4 - hexafluoro - 1 - hydroxycyclobutane) as a clear, colorless liquid boiling at 95° C. under a pressure corresponding to 1 mm. of mercury; $n_D^{25}$, 1.4070. The infrared spectrum was wholly consistent with the cyclohexenylvinylidenebis(hexafluorocyclobutanol) structure.

*Analysis.*—Calcd. for $C_{16}H_{12}F_{12}O_2$: C, 41.4%; H, 2.6%; F, 49.1%. Found: C, 41.4%; H, 2.7%; F, 48.9%.

*Example XXX*

As disclosed and claimed in my copending application Serial No. 782,616, filed December 24, 1958 (see Example II), a glass reactor as in Example I was cooled in a liquid nitrogen bath, charged with six parts of freshly distilled cyclopentadiene, and sixteen parts (1.26 molar proportions based on the diene) of perfluorocyclobutanone. The reactor was sealed and allowed to warm to room temperature. The tube was then refrozen, opened, and the reaction mixture separated by distillation. There was thus obtained 20.5 parts (93% of theory) of 2-oxabicyclo-[2.2]hept - 5 - ene - 3 - spiro - 1' - 2',2',3',3',4',4' - hexafluorocyclobutane, i.e., 1,1,2,2,3,3-hexafluoro - 6,9-methano-5-oxaspiro[3.5]non-7-ene, as a clear, colorless liquid boiling at 51° C. under a pressure corresponding to 10 mm. of mercury; $n_D^{25}$, 1.3865. Infrared and nuclear magnetic resonance spectra were consistent with the oxabicycloheptanespirohexafluorocyclobutane, or hexafluoromethanooxaspirononene, structure.

*Analysis.*—Calcd. for $C_9H_6F_6O$: C, 44.3%; H, 2.5%; F, 46.7%. Found: C, 44.1%; H, 2.7%; F, 46.5%.

The reaction was repeated and the product distilled at atmospheric pressure. It became a viscous syrup which was only partly distillable at a pressure corresponding to .5 mm. of mercury (B.P. 42–132° C./5 mm.). A sample (B.P. 88–107° C./5 mm.) which at room conditions was a slightly yellow glass was characterized by infrared absorption as 1-(1-cyclopentadienyl) - 2,2,3,3,4,4 - hexafluorocyclobutanol. It is apparent that the original hexafluoromethanooxaspirononene is readily rearranged thermally to cyclopentadienylhexafluorocyclobutanol which, spontaneously, under the thermal conditions involved forms addition polymers.

The present invention is generic to 3,3,4,4 - tetrafluoro-2,2 - dihalo - 1 - hydroxycyclobutyl-substituted compounds wherein the said cyclobutyl rings are linked by at most one intervening saturated carbon atom to a carbon atom which is involved in multiple linkage with another carbon atom, a nitrogen atom, or an oxygen atom, the remainder of the structure being otherwise wholly hydrocarbon or halohydrocarbon. The present invention is likewise generic to the preparation of these new mono- and bistetrafluorodihalohydroxycyclobutyl - substituted compounds by the direct addition reaction between the requisite 2,2 - dihalo - 3,3,4,4 - tetrafluorocyclobutanone and the requisite active hydrogen-containing carboxaldehyde, ketone, nitrile, monoolefin of at least three carbons, allene, or hydrocarbon or halohydracarbon-substituted monoolefins, allenes, and acetylenes.

In the case of the monocarboxaldehydes, the active hydrogen is hydrogen on the carbon alpha to the carboxaldehyde function, i.e., alpha to the formyl group. This hydrogen adds across the ring carbonyl of the tetrafluorodihalocyclobutanone with the hydrogen adding to the oxygen forming an hydroxyl group and the remaining valence bond of the original carbonyl double bond then adding to the α-carbon from which the hydrogen came. Accordingly, the radical pendent on the ring carbon of the tetrafluorodihalocyclobutane moiety carrying the newly-formed hydroxyl group is the monovalent radical resulting from removal of one α-hydrogen from the monocarboxaldehyde structure. Normally, only one such addition will occur despite the fact that the initial monocarboxaldehyde might contain two α-hydrogens. The same type reaction occurs with the nitriles affording, therefore, α-(1-hydroxy-2,2-dihalo - 3,3,4,4 - tetrafluorocyclobutyl)nitriles. The structure of the nitrile moiety remains unchanged except for the introduction on the α-carbon thereof of the 3,3,4,4-tetrafluoro-2,2-dihalo - 1 - hydroxycyclobutyl substituent. Again, as in the case of the monocarboxaldehydes, despite the fact that some of the mononitriles will have two active hydrogens on the α-carbon, only one of such hydrogens generally enters into reaction across the ketone carbonyl of the tetrafluorodihalocyclobutanone coreactants.

In the case of the ketones where there can be present two active hydrogen-bearing α-carbons, the same reactions occur except that there are usually obtained both mono- and bis(3,3,4,4-tetrafluoro-2,2-dihalo-1-hydroxycyclobutyl) substituted products. Frequently mixtures of the two products will be obtained. In the case of the disubstituted products, each α-carbon of the two radicals pendent on the ketone carbonyl generally will carry one 3,3,4,4 - tetrafluoro - 2 - dihalo - 1 - hydroxycyclobutyl substituent. As in the case of the carboxaldehydes and nitriles, the remainder of the ketone coreactant structure will remaind unaltered. In those instances where there are active hydrogens on only one of the α-carbons of the ketone radicals pendent on the ketone carbonyl, the tetrafluorodihalohydroxycyclobutyl substituent can enter only on the carbon carrying the active hydrogen. In special instances of this type wherein the single active hydrogen-bearing α-carbon is made more chemically reactive by virtue of the structure of the other radical pendent on ketone carbonyl, more than one tetrafluorodihalohydroxycyclobutyl substituent can be placed on the α-carbon carrying the active hydrogens as illustrated in detail, for instance, in the foregoing in the case of 1,1,1-trifluoroacetone where two of the 3,3,4,4-tetrafluoro-2,2,-dihalo-1-hydroxycyclobutyl substituents are inserted on the α-carbon bearing the active hydrogens.

In the case of the olefins, allenes, acetylenes, and halo-, hydrocarbon-, and halohydrocarbyl-substituted olefins, allenes, and acetylenes, the active hydrogen is that on either multiply bonded carbon or on carbon alpha thereto in those instances where there is no hydrogen on multiply bonded carbon. The said active hydrogen adds across the ketone carbonyl as just described for the aldehydes, nitriles, and ketones, and the remainder of the olefin, allene, acetylene, or halo-, hydrocarbon-, or halohydrocarbon-substituted olefin, allene, or acetylene coreactant remains the same except that in those instances where the multiple bond can shift, then a bond shift to the next position adjacent the enering tetrafluorodihalohydroxycyclobutyl ring is encountered. For instance, as illustrated in detail in the foregoing, an allene coreactant is shifted into an acetylenic moiety in the resulting tetrafluorodihalohydroxycyclobutyl-substituted product. Similarly, an alkyl-substituted acetylene coreactant becomes an allenic moiety in the final tetrafluorodihalohydroxycyclobutyl-substituted product. However, in those instances where a band shift cannot be effected, for instance, in the case of phenylacetylene, the phenylacetylene structure remains unchanged in the final product.

These various reactions and the products obtained therein are illustrated in the following generalized equations, wherein: the X's, alike or different, are used to represent halogens of atomic number 9–35 inclusive; the R's, alike or different, are used to represent hydrogens or hydrocarbon or halohydrocarbon radicals generally of no more than 7–8 carbons each and can be together joined in a carbocyclic ring of 4–7 ring members; and R′ is one carbon shorter than R, utilizing generic representation for the carboxaldehyde, ketone (including both types, i.e, those where both α-carbons carry active hydrogen and only one α-carbon carries active hydrogen), nitrile, olefin, acetylene, and allene reactants (again including those types wherein the active hydrogen is on the multiple carbon links or is separated therefrom by one intervening saturated carbon):

(1) 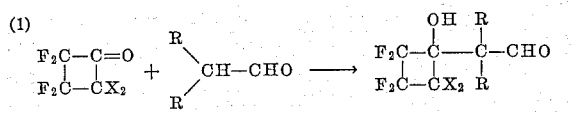

(2) 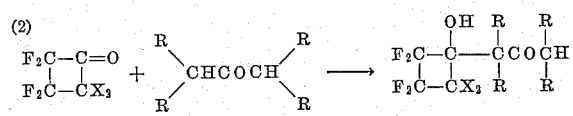

and

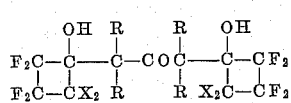

(3) 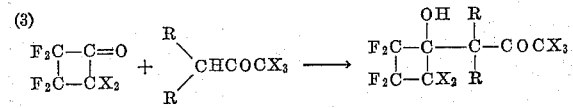

(4) 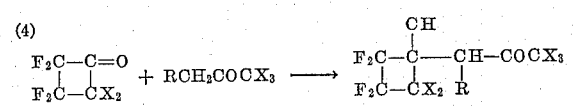

and

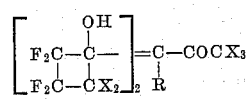

(5) 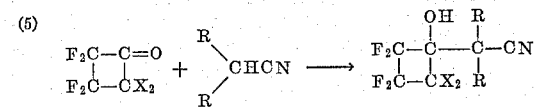

(6) 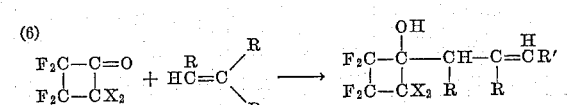

(7) 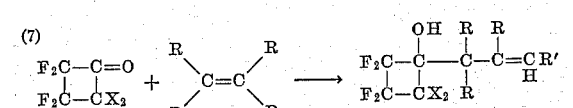

(8) 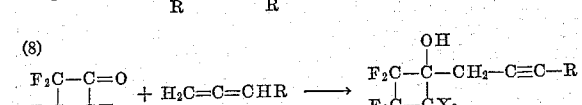

(9) 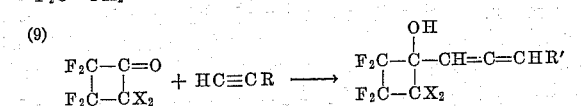

(10) 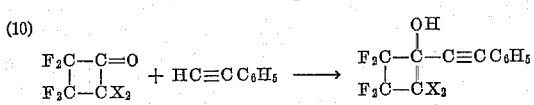

The reaction is a simple one and requires no complicated operating procedures or equipment. Generally the reaction is carried out in sealed reactors, of which the most convenient are glass or glass-lined reactors. Because of the relatively low-boiling nature of some of the 2,2-dihalo-3,3,4,4-tetrafluorocyclobutanones and likewise because of the extreme chemical reactivity of these compounds, e.g., with, for instance, water, and especially with the present coreactants, the reaction will generally be carried out by cooling the reactor to liquid nitrogen temperatures or at least to those of solid carbon dioxide (about −80° C.), charging the particular 2,2,-dihalo-3,3,4,4-tetrafluorocyclobutanone involved as well as the active hydrogen-containing coreactant, purging the reaction vessel with nitrogen, sealing, and allowing the reactor to warm slowly to room temperature. With the higher-boiling ketones sealed systems are not normally used. The reaction will simply be carried out at the reflux under anhydrous conditions.

The cycloaddition reaction is effected thermally. Depending on the relative reactivity of the tetrafluorodihalocyclobutanones and active hydrogen-containing coreactants, the necessary reaction temperatures and reaction times will vary. With the more reactive pairs, the reaction is spontaneous and exothermic, sometimes even at reduced temperatures. Accordingly, appropriate care should be taken in charging the reactants. Normally temperatures in the range 75–80° C. will suffice for some of the systems. Reaction times will vary from a few minutes to a few hours. In the case of the less reactive systems, higher temperatures and longer reaction times, e.g., a few days, will be needed. Temperatures higher than in the range 150–200° C. will normally not be required. Under these conditions even with the less reactive systems reaction times required will be at most a few hours to a few days. For convenience an overnight period is frequently used. In those instances wherein the reaction is carried out in a sealed reactor, the reaction will, of course, be affected at elevated pressures. No externally-applied pressure is required. The simple autogenous pressure of the reactants under the temperature conditions used will suffice.

The reaction mixtures are worked up quite simply to obtain the tetrafluorodihalohydroxycyclobutyl substituted products. Thus, at the completion of the reaction it is only necessary to open the reactor, distill away any unreacted dihalotetrafluorocyclobutanone or active hydrogen containing coreactant, and isolate and purify the desired products, normally by distillation. The majority of these products are liquid or can be handled in the liquid phase at elevated temperatures and reduced pressures. The boiling point of the liquid products and the melting point of the solid products vary as is usual with increasing molecular weight of the over-all compounds. As the molecular weight of the halogen substituents on the cyclobutane ring and/or the molecular weight of any hydrocarbon or halohydrocarbon substituents in the rest of the molecule increase, the boiling point of the liquids will increase and the melting point of the solids will increase. Generally when the active hydrogen containing coreactant has the said hydrogen on cyclic, i.e., here on carbocyclic, carbon the products will be solids. The bis products, i.e., those containing two of the tetrafluorodihalohydroxycyclobutyl rings, will also be solids. The solid products will be removed by filtration and, where necessary, can be purified by conventional recrystallization techniques, using such solvents as the aromatic hydrocarbons, e.g., benzene, toluene; the cycloaliphatic hydrocarbons such as cyclohexane, the methylcyclohexanes; and the like. Mixtures of these conventional solvents can also be used.

The reaction can be effected properly in the presence or absence of an inert organic reaction medium, which, if present, should be anhydrous. Any inert liquid organic diluent can be used and, generally speaking, the most common are the normally liquid hydrocarbons and polyfluorohydrocarbons, including aliphatic and aromatic compounds such as the hexanes, heptanes, octanes, and the like; benzene, toluene, the xylenes, and the like; cycloaliphatic hydrocarbon solvents such as cyclohexane, and the like; the polyfluoroaliphatic hydrocarbons, e.g., 1,1,-2,2-tetrafluoro-3,3-dimethylbutane and the like; the polyfluoroaliphatic/cycloaliphatic hydrocarbarbons, e.g., perfluorodimethylcyclohexane and the like. The choice of the particular diluent, if used, is not at all critical and will vary with such other normal variables as the reaction temperature found necessary to effect reaction. In most instances, in order to simplify the reaction, no diluent is used. The requisite 2,2-dihalo-3,3,4,4-tetrafluorocyclobutanone and active hydrogen containing coreactants are simply mixed and heated together as described previously and the product isolated therefrom by distillation, and crystallization where necessary, after the reaction has been completed. The absence of a diluent generally makes separation of unreacted material and the desired products easier.

From the foregoing it is apparent that, in preparing these new tetrafluorodihalohydroxycyclobutyl substituted products, there can be used any 2,2-dihalo-3,3,4,4-tetrafluorocyclobutanone wherein the two halogen substituents are of atomic number from 9 to 35, inclusive, i.e., fluorine, chlorine, and bromine alike or different. More specifically, there can be used perfluorocyclobutanone, 2-chloro-2,3,3,4,4-pentafluorocyclobutanone, 2-bromo-2,3,-3,4,4 - pentafluorocyclobutanone, 2-bromo-2-chloro-3,3,-4,4 - tetrafluorocyclobutanone, 2,2 - dichloro - 3,3,4,4-tetrafluorocyclobutanone, and 2,2-dibromo-3,3,4,4-tetrafluorocyclobutanone.

Of these polyfluorocyclobutanones, the various chlorofluorocyclobutanones have been disclosed in U.S. Patents 2,712,554 and -5, although no detailed method for the preparation thereof is given. Perfluorocyclobutanone is described and claimed in U.S. Patent 3,039,995. All of these polyfluoroperhalocyclobutanones can be readily prepared by the cycloaddition reaction between perfluorovinyl hydrocarbyl ethers with the requisite 1,1-dihalo-2,2-difluoroethylenes followed by hydrolysis of the resultant 1-hydrocarbyloxy - 1,3,3,4,4-pentafluoro - 2,2 - dihalocyclobutanes, all as disclosed and claimed in detail in the above-referred to copending application Ser. No. 717,805. These cyclobutanones are generically gaseous to liquid, depending on the total molecular weight which varies with the halogens, quite reactive materials which should preferably be handled under anhydrous conditions.

As the cycloaddition coreactants with the just-described tetrafluorodihalocyclobutanones to make the new mono- and bis-3,3,4,4-tetrafluoro-2,2-dihalo-1-hydroxycyclobutyl-substituted products of the present invention, there can be used any active hydrogen containing coreactant wherein said active hydrogen is directly on, or separated therefrom by at most one intervening saturated carbon atom, a carbon which is multiply linked to another carbon, an oxygen, or a nitrogen atom, the remainder of the molecule being otherwise solely hydrocarbon or halohydrocarbon. The said multiple linkage must also be acyclic. Included in this class of coreactants are the carboxaldehydes, ketones, nitriles, olefins, allenes, and acetylenes as well as the corresponding halo-, hydrocarbon-, and halohydrocarbon-substituted olefines, allenes, and acetylenes as well as the corresponding halogenated carboxaldehydes, ketones, and nitriles. The most useful of these carboxaldehyde, ketone, nitrile, olefine, allene, or acetylene coreactants are those wherein any radicals pendent on the carbon involved in the necessary multiple linkage with a carbon, nitrogen, or oxygen atom are of no more than eight carbons each and wherein any halogen substituents are fluorine or chlorine, especially the former.

Suitable specific illustrations of useful active hydrogen-containing carboxaldehyde, ketone, nitrile, olefin, allene, and acetylene coreactants within the broad genus just defined include long-chain carboxaldehydes such as n-decyl aldehyde; long-chain ketones such as di-n-octyl ketone, i.e., 9-heptadecanone; active hydrogen-containing nitriles such as diphenylacetonitrile, methacrylyl chloride, trifluoromethylacetonitrile, i.e., 3,3,3-trifluoropropionitrile; long-chain substituted olefins such as n-decene; long chain allenes such as n-octyl allene, i.e., 1,2-undecadiene; and long-chain acetylenes such as n-octyl-acetylene, i.e., 1-decyne; and the like. Mixtures of these various coreactants can be used as well as mixtures of the 3,3,4,4-tetrafluoro-2,2-dihalocyclobutanone coreactants. However, when mixtures of either of the coreactant types are used, obviously mixtures of products will be obtained which, because of their close relationship chemcially and structurally, are difficult to separate. Accordingly, it is generally preferred only to use one 3,3,4,4-tetrafluoro-2,2-dihalocyclobutanone and only one carboxaldehyde, ketone, nitrile, olefin, allene, or acetylene coreactant at any one time.

Using the cycloaddition reaction conditions outlined in the foregoing, there will be obtained from the specific 3,3,4,4-tetrafluoro-2,2-dihalocyclobutanones and the active hydrogen-containing carboxaldehyde, ketone, nitrile, olefin, allene, and acetylene coreactants, just discussed generically and illustrated with suitable specific examples, additional 3,3,4,4-tetrafluoro-2,2-dihalo -1- hydroxycyclobutyl-substituted products of the present invention. More specifically, from perfluorocyclobutanone and diphenylacetonitrile there will be obtained (2,2,3,3,4,4-hexafluoro-1 - hydroxycyclobutyl) - diphenylacetonitrile. From 2 - chloro-3,3,4,4,2-pentafluorocyclobutanone and di-n-octyl ketone, i.e., 9-heptadecanone, there will be obtained 2-chloro-1-(9-oxo - 8 - heptadecyl) - 2,3,3,4,4 - pentafluorocyclobutanol and 9-oxo-8,10-heptadecylenebis(2-chloro-3,3,4,4 - pentafluorocyclobutanol). From 2 - bromo-2,3,3,4,4-pentafluorocyclobutanone and methallyl chloride there will be obtained 2-bromo-2,3,3,4,4-pentafluoro-1-(2-chloro-2-propenyl)cyclobutanol. From 2 - bromo - 2-chloro-3,3,4,4-tetrafluorocyclobutanone and n-decyl aldehyde, i.e., n-decanal, there will be obtained 2-bromo-2-chloro-3,3,4,4-tetrafluoro-1-(1-formyl-n-nonyl)cyclobutanol. From 2,2-dichloro-3,3,4,4-tetrafluorocyclobutanone and trifluoromethylacetonitrile, i.e., 3,3,3-trifluoropropionitrile, there will be obtained 2,2-dichloro-3,3,4,4-tetrafluoro - 1-(1-cyano-2,2,2-trifluoroethyl)cyclobutanol. From 2,2-dibromo-3,3,4,4-tetrafluorocyclobutanone and n-octylallene, i.e., 1,2-undecadiene, there will be obtained 2,2-dibromo-3,3,4,4-tetrafluoro - 1 - (2 - undecynyl)cyclobutanol. From perfluorocyclobutanone and n-octylacetylene, i.e., 1-decyne, there will be obtained 2,2,3,3,4,4-hexafluoro-1-(1-2 - decadienyl)cyclobutanol. From perfluorocyclobutanone and 1-decene, there will be obtained 2,2,3,3,4,4 - hexafluoro-1-(2-decenyl)cyclobutanol. From perfluorocyclobutanone and acetylene there will be obtained 1,1'-ethynylenebis-(perfluorocyclobutanol).

These new 3,3,4,4-tetrafluoro-2,2-dihalo-1-hydroxycyclobutyl-substituted unsaturated compounds are generically useful as solvents for highly fluorinated polymers, for instance, the polyfluorinated olefins or more precisely the polymers of polyfluorinated olefins. Solutions of such polymers, e.g., polytetrafluoroethylene, polychlorotrifluoroethylene, and the like, in these tetrafluorodihalohydroxycyclobutyl-substituted unsaturated compounds are readily obtained by heating the polymers at approximately 1–10% weight concentration in the tetrafluorodihalohydroxycyclobutyl-substituted compounds conveniently at the reflux. Such solutions are useful in rendering waterproof and water repellent such shaped objects of cellulose as paper, wood, and the like, as well as in forming films and fibers and other shaped products of the polyfluorinated olefin polymers. In addition to their excellent waterproof and water repellent-rendering properties, solutions of these polyfluorinated olefin polymers are also useful in rendering such shaped objects of cellulose non-supportive of combustion or markedly decreasing the tendency such materials normally have for burning. More specifically:

EXAMPLE A

*Use of the Tetrafluorodihalohydroxycyclobutyl-Substituted Compounds as Solvents*

An approximately 10% by weight solution of a low molecular weight, relatively low melting tetrafluoroethylene polymer (melting range, 83–150° C.) in the 2,2,3,3,4,4 - hexafluoro-1-(1,1,2-trimethyl-2-propenyl)cyclobutanol of Example II was prepared by heating the polymer in the cyclobutanol at the reflux. Strips of filter paper were immersed in the hot solution, removed, and the cyclobutanol solvent completely removed therefrom by treatment with acetone. The thus-treated strips were then dried and, on testing, found to be water repellent and somewhat resistant to burning. In contrast, of course, untreated control strips of the same filter paper were rapidly and completely wet on contact with water and, furthermore, burned rapidly when subjected to a flame. The hot solution of the tetrafluoroethylene polymer in the hexafluorotrimethylpropenylcyclobutanol, on cooling, set to a solid opaque gel plug of the polymer in the cyclobutanol.

The same results were obtained using the 1,1-dimethyl-2 - methylene - 1,3 - propylenebis(1-hydroxy-2,2,3,3,4,4-hexafluorocyclobutane) of Example II, the 2,2,3,3,4,4-hexafluoro-1-(2-propynyl)cyclobutanol of Example III, the 2,2,3,3,4,4 - hexafluoro-1-propadienylcyclobutanol of Example IV, the 2,2,3,3,4,4 - hexafluoro - 1 - (1,2-hexadienyl)cyclobutanol of Example V, the 1-(2-phenylethynyl)-2,2,3,3,4,4-hexafluorocyclobutanol of Example VI, the 2,2,3,3,4,4 - hexafluoro-1-(2-oxopropyl)cyclobutanol and the 2-oxo-1,3-propylenebis(2,2,3,3,4,4-hexafluorocyclobutanol) of Example VII, the 2,2,3,3,4,4-hexafluoro-1-(1-formyl-n-hexyl)cyclobutanol of Example XIV, the 1-(2-oxocyclopentyl)-2,2,3,3,4,4-hexafluorocyclobutanol of Example XV, the 1,1'-2-oxo-1,3-cyclopentylenebis(perfluorocyclobutanol) of Example XVI, the 1-(2-oxocyclohexyl)-2,2,3,3,4,4-hexafluorocyclobutanol of Example XVII, the 1,1'-2-oxo-1,3-cyclohexylenebis(perfluorocyclobutanol) of Example XVIII, the 1 - (2 - oxocycloheptyl)-2,2,3,3,4,4-hexafluorocyclobutanol and the 1,1'-2-oxo-1,3-cycloheptylenebis(perfluorocyclobutanol) of Example XIX, the 2,2,3,3,4,4-hexafluoro-1-trifluoroacetylmethylcyclobutanol and the 1,1' - trifluoroacetylmethylenebis(hexafluorocyclobutanol) of Example XXI, the 1-(2-oxo-3-butenyl)-2,2,3,3,4,4-hexafluorocyclobutanol of Example XXII, the 1-(β-phenylvinyl)hexafluorocyclobutanol of Example XXIII, the 1-(2-phenyl-2-propenyl)-2,2,3,3,4,4 - hexafluorocyclobutanol of Example XXIV, the 1,1'-1-(phenylvinyl)methylenebis-(hexafluorocyclobutanol) of Example XXV, and the 1-(α-cyanobenzyl)-2,2,3,3,4,4-hexafluorocyclobutanol of Example XXVI.

Since obvious modifications of the invention will be evident to those skilled in the chemical arts, I propose to be bound solely by the appended claims.

The embodiments of the invention in which an exclusive property or privilege is claimed are defined as follows:

1. Compounds of the formula

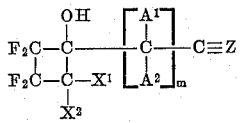

wherein: $m$ is an integer from 0 to 1; $X^1$ and $X^2$ are halogen of the group consisting of fluorine, chlorine and bromine; $A^1$ and $A^2$ are selected from the group consisting, jointly, of a single divalent hydrocarbon radical of between 3 and 7 chain carbons and, separately, of two monovalent members of the group consisting of hydrogen, fluorine, chlorine, bromine and hydrocarbon and halohydrocarbon of up to 8 carbons; and Z is selected from the class consisting of ≡N and ≡CR wherein R is selected from the group consisting of hydrogen and monovalent hydrocarbon of up to 8 carbons.

2. Compounds of the formula

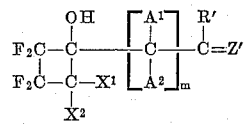

wherein: $m$ is an integer from 0 to 1; $X^1$ and $X^2$ are halogen of the group consisting of fluorine, chlorine and bromine; $A^1$ and $A^2$ are selected from the group consisting, jointly, of a single divalent hydrocarbon radical of between 3 and 7 chain carbons and, separately, of two monovalent members of the group consisting of hydrogen, fluorine, chlorine, bromine and hydrocarbon and halohydrocarbon of up to 8 carbons; R' is selected, separately, from the group consisting of hydrogen, fluorine, chlorine and bromine, monovalent hydrocarbon and halohydrocarbon of up to 8 carbons, and, jointly with $A^1$, divalent hydrocarbon of up to 6 carbons; and Z' is selected from the class consisting of =CR''$_2$, =C=CHR'', and =O, R'' being selected from the class consisting of hydrogen and monovalent hydrocarbon of up to 8 carbons.

3. Compounds of the formula

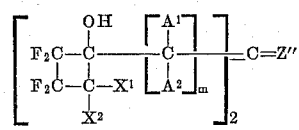

wherein: $m$ is an integer from 0 to 1; $X^1$ and $X^2$ are halogen of the group consisting of fluorine, chlorine and bromine; $A^1$ and $A^2$ are selected from the group consisting, jointly, of a single divalent hydrocarbon radical of between 3 and 7 chain carbons and, separately, of two monovalent members of the group consisting of hydrogen, fluorine, chlorine, bromine, hydrocarbon and halohydrocarbon of up to 8 carbons; and Z'' is selected from the class consisting of =CR''$_2$ and =O, R'' being selected from the group consisting of hydrogen and monovalent hydrocarbon of up to 8 carbons.

4. 2,2,3,3,4,4-Hexafluoro - 1 - hydroxy-1-(2-propenyl)-cyclobutane.

5. 2,2,3,3,4,4-Hexafluoro-1-propadienylcyclobutanol.

6. 1-(2-phenylethynyl)-2,2,3,3,4,4 - hexafluorocyclobutanol.

7. 2,2,3,3,4,4-Hexafluoro-1-acetylmethylcyclobutanol.

8. 3 - Acetyl-2-(2,2,3,3,4,4-hexafluoro-1-hydroxycyclobutyl)-5,5,6,6,7,7-hexafluoro-1-oxaspiro[3.3]heptane.

9. 3-(2,2,3,3,4,4 - Hexafluoro - 1 - hydroxycyclobutyl)-isochroman-1-spiro-1'-perfluorocyclobutane.

10. 2,2,3,3,4,4-Hexafluoro - 1 - (1,1,2-trimethyl-2-propenyl)cyclobutanol.

11. 1,1 - Dimethyl-2-methylene-1,3-propylenebis(2,2,3,3,4,4-hexafluorocyclobutanol).

12. 2,2,3,3,4,4-Hexafluoro - 1 - (2 - propynyl)cyclobutanol.

13. 2,2,3,3,4,4-Hexafluoro - 1 - (1,2-hexadienyl)cyclobutanol.

14. 2-Oxo-1,3-propylenebis(hexafluorocyclobutanol).

15. 2-Chloro-1-(2 - phenylethynyl)-2,3,3,4,4-pentafluorocyclobutanol.

16. 2-Chloro-2,3,3,4,4-pentafluoro - 1 - benzoylmethylcyclobutanol.

17. 2,2-Dichloro 1 - (2 - phenylethynyl)-3,3,4,4-tetrafluorocyclobutanol.
18. 2,2-Dichloro-3,3,4,4-tetrafluoro - 1 - (2-propenyl)-cyclobutanol.
19. 2,2-Dichloro-3,3,4,4-tetrafluoro - 1 - acetylmethyl-cyclobutanol.
20. 2,2-Dichloro - 1 - (2-oxocyclohexyl)-3,3,4,4-tetrafluorocyclobutanol.

References Cited in the file of this patent
FOREIGN PATENTS 82,232   Norway _____ Dec. 17, 1947

OTHER REFERENCES

Bergmann: "The Chemistry of Acetylene and Related Compounds," p. 80 (1948).